US008504777B2

(12) United States Patent
Moyer (10) Patent No.: US 8,504,777 B2
(45) Date of Patent: Aug. 6, 2013

(54) DATA PROCESSOR FOR PROCESSING DECORATED INSTRUCTIONS WITH CACHE BYPASS

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 504 days.

(21) Appl. No.: 12/886,641

(22) Filed: Sep. 21, 2010

(65) Prior Publication Data

US 2012/0072675 A1    Mar. 22, 2012

(51) Int. Cl.
*G06F 13/20* (2006.01)

(52) U.S. Cl.
USPC ........... 711/138; 711/118; 711/139; 711/141; 711/142

(58) Field of Classification Search
USPC .......................... 711/118, 138, 139, 141, 142
See application file for complete search history.

(56) References Cited

U.S. PATENT DOCUMENTS

| | | | |
|---|---|---|---|
| 5,301,298 A * | 4/1994 | Kagan et al. .................. | 711/141 |
| 5,848,293 A | 12/1998 | Gentry | |
| 6,253,273 B1 | 6/2001 | Blumenau | |
| 6,954,826 B2 | 10/2005 | Moyer | |
| 7,409,502 B2 | 8/2008 | Moyer et al. | |
| 2001/0052053 A1 * | 12/2001 | Nemirovsky et al. ......... | 711/138 |
| 2003/0065890 A1 * | 4/2003 | Lyon ............................. | 711/141 |
| 2004/0153607 A1 * | 8/2004 | Rowlands et al. ............ | 711/118 |
| 2004/0236911 A1 | 11/2004 | Moyer | |
| 2005/0240745 A1 | 10/2005 | Iyer et al. | |
| 2005/0251617 A1 * | 11/2005 | Sinclair et al. ................ | 711/103 |
| 2005/0257025 A1 | 11/2005 | Spencer | |
| 2007/0150671 A1 | 6/2007 | Kurland | |
| 2007/0266217 A1 | 11/2007 | Moyer | |
| 2008/0162829 A1 | 7/2008 | Scott et al. | |
| 2009/0100232 A1 | 4/2009 | Momose | |
| 2010/0106872 A1 | 4/2010 | Moyer et al. | |
| 2010/0107243 A1 | 4/2010 | Moyer et al. | |

OTHER PUBLICATIONS

U.S. Appl. No. 12/259,369, filed Oct. 28, 2008.
Chu, S-L et al.; "SAGE: an automatic analyzing system for a new high-performance SoC architecture—processor-in-memory", Journal of Systems Architecture, Elsevier BV, NL, vol. 50, No. 1, Jan. 1, 2004, pp. 1-15.
EP Application 11177484.0-1243, International Search Report and Written Opinion, dated Jan. 27, 2012.

* cited by examiner

*Primary Examiner* — Jae Yu
(74) *Attorney, Agent, or Firm* — Joanna G. Chiu; David G. Dolezal (57) ABSTRACT

A method includes determining if a data processing instruction is a decorated access instruction with cache bypass, and determining if the data processing instruction generates a cache hit to a cache. When the data processing instruction is determined to be a decorated access instruction with cache bypass and the data processing instruction is determined to generate a cache hit, the method further includes invalidating a cache entry of the cache associated with the cache hit; and performing by a memory controller of the memory, a decoration operation specified by the data processor instruction on a location in the memory designated by a target address of the data processor instruction, wherein the performing the decorated access includes the memory controller performing a read of a value of the location in memory, modifying the value to generate a modified value, and writing the modified value to the location.

20 Claims, 5 Drawing Sheets

DATA PROCESSOR FOR PROCESSING DECORATED INSTRUCTIONS WITH CACHE BYPASS

BACKGROUND

1. Field

This disclosure relates generally to data processing systems, and more specifically, to processing decorated instructions with cache bypass.

2. Related Art

In a multiple processor or multiple core data processing system that implements a network, multiple counters are used to maintain statistics requiring a variety of functions such as increment, decrement and read-modify-write operations. Because multiple cores may attempt to update the identical counter at the same time, network delays are created and a significant amount of resources are consumed. A single communication link can generate a need for up to a couple hundred million counter updates per second where each update is modifying a prior data value. A mechanism for performing atomic updates, i.e. un-interruptible successive updates, is typically required. Conventional atomic update mechanisms, such as using a software semaphore or a software lock, can cause system delays. To reduce system delays, a statistics accelerator may be used. However, in a single transaction enough information cannot typically be sent to a statistics accelerator to describe an atomic operation.

Because the counter bit sizes can be larger than the size of registers within a processor, a lock variable has also been used to limit access to a counter while multiple storage accesses update sub-sections of the counter. When a core needs to gain ownership of a counter for an atomic update, a significant number of data processing cycles may pass for each lock variable. A processor must use processing cycles to obtain the lock variable, wait for the lock variable to be released if already taken by another processor, perform the counter update and release the lock variable. Thus the system speed and performance is degraded.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

There is herein described a method for operating a data processing system that has a processor and a memory device which is a target or recipient of information from the processor. The processor and memory device are coupled for operating via a system interconnect. The processor executes or processes decorated instructions. As part of the instruction execution of a decorated instruction, the processor determines an instruction operation associated with the instruction and an address. A decoration value is also determined by the processor based on the decorated instruction. A decoration value or decoration is information that is supplied to the memory device for performing decorated operations. The decoration value is provided from storage in a general purpose register of the processor and is transmitted to the memory device along with a physical address which indicates a target location resulting from the decorated instruction execution. The decoration value is a command to the memory device to perform a function in addition to a primary function of the executed decorated instruction. For example, the executed decorated instruction may be a decorated load or a decorated store which indicates a target location of the memory device, and the decoration value may be a command to modify the value stored in the target location in some manner. For example, it may be a command to increment or decrement the target location or to multiply the target location data by another operand. For decorated loads and stores, both the target address (i.e. the physical address) and the decorated value are provided to the memory device. In the case of a decorated store instruction, a data value may or may not also be provided from the processor to the memory device. In the case of a decorated load instruction, a data value is returned from the memory device to the processor, where the data value may be the data value stored at the target address prior to or after performing the modification indicated by the decoration value. It should be understood that any of various additional or alternate processing functions may be implemented by the target device in response to the decoration value. The decoration value is not generally interpreted by the processor but is interpreted by the memory device. In this manner, the processor need not have any knowledge of the function performed by the decoration value.

In one embodiment, a decorated access instruction may perform a decorated access (e.g. load or store) with cache bypass. In this situation, since the decoration value is a command which results in a modification of the target location in the memory device by the memory device, an update to the cache for the decorated access may result in inaccurate information being stored in the cache. Therefore, in one embodiment, upon determining that an instruction is a decorated instruction with cache bypass, no new cache entry is allocated, regardless of what the cache allocation policy indicates. That is, even if the access address of the decorated access instruction results in a cache miss, and the cache allocation policy indicates that a cache allocation should be performed in response to cache misses, no allocation is performed for the decorated access instruction with cache bypass. Furthermore, if the access address of the decorated access instruction results in a cache hit, then the cache entry which resulted in a hit is flushed and invalidated prior to the memory device completing the function indicated by the decoration value.

As used herein, the term "bus" is a system interconnect and is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
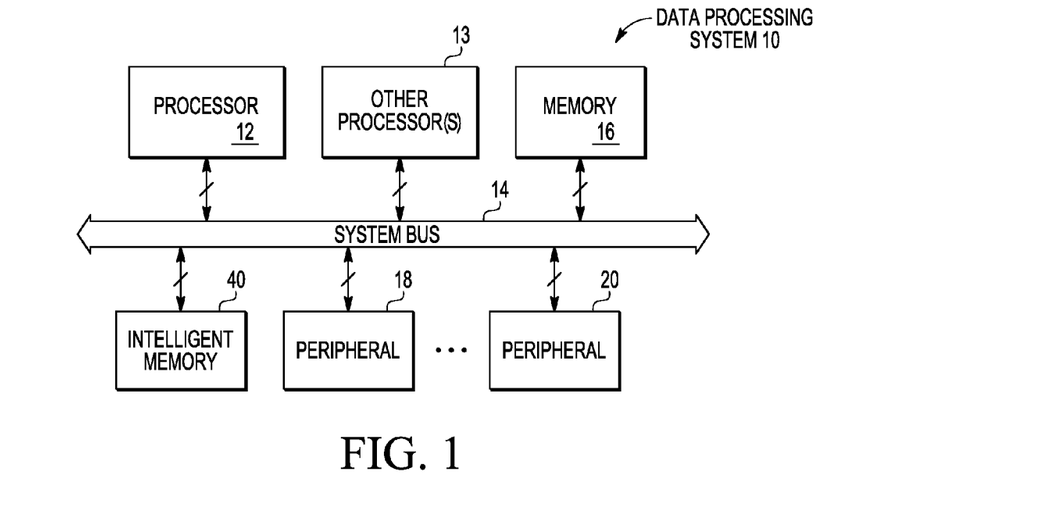
FIG. 1 illustrates, in block diagram form, a data processing system in accordance with one embodiment of the present invention.

FIG. 1 illustrates, in block diagram form, a data processing system 10 in accordance with one embodiment of the present invention. Data processing system 10 includes a processor 12, one or more other processors 13, a system bus or system interconnect 14, a memory 16 and a plurality of peripherals such as a peripheral 18, a peripheral 20, an intelligent memory 40 and, in some embodiments, additional peripherals as indicated by the dots in FIG. 1 separating peripheral 18 from peripheral 20. Note that additional processor(s) 13 may not be present. An intelligent memory 40 is coupled to the system interconnect 14 by bidirectional multiple conductors. Memory 16 is a system memory that is coupled to system interconnect 14 by a bidirectional conductor that, in one form, has multiple conductors. Intelligent memory 40 is a target device of processor 12 for certain instruction execution as will be explained below. In the illustrated form each of peripherals 18 and 20 is coupled to system interconnect 14 by bidirectional multiple conductors as is processor 12, and other processor(s) 13. Note that memory 16 can be any type of memory, and peripherals 18 and 20 can each be any type of peripheral or device. In one embodiment, all of data processing system 10 is on a single integrated circuit. Alternatively, data processing system 10 can be implemented using more than one integrated circuit. In one embodiment, at least all of processor 12 is on a single integrated circuit. In another form, system interconnect 14 represents a wireline interconnect and processor 12 may be physically remote from the target device such as intelligent memory 40. In an alternate embodiment, multiple intelligent modules, such as intelligent memory 40 may be present.

In operation, processor 12 functions to implement a variety of data processing functions by executing a plurality of data processing instructions. Information needed by processor 12 that is not within processor 12 can be stored in memory 16 or intelligent memory 40. In one embodiment, memory 16 and intelligent memory 40 are referred to as external memories. Intelligent memory 40 is a memory that includes additional circuitry for performing computations as well as implementing the conventional data storage function that a memory conventionally performs. The computations that intelligent memory 40 performs in response to a memory location access are implementation-specific and may vary in various embodiments. In one form the computations are performed in an atomic fashion meaning that the computations are un-interruptible and are completed prior to allowing a subsequent access request to the memory location being modified by the computation. Examples of atomic computations include, but are not limited to, atomic increment or atomic decrement.

Figure 2:
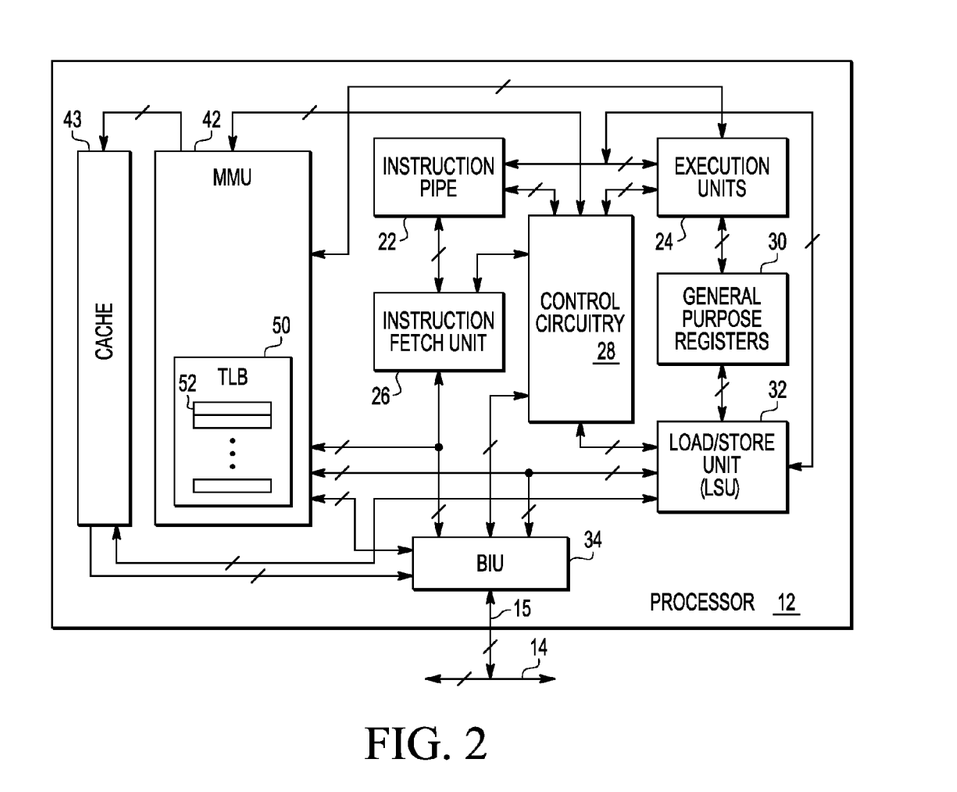
FIG. 2 illustrates, in block diagram form, an exemplary processor of the data processing system of FIG. 1 in accordance with one embodiment of the present invention.

FIG. 2 illustrates in block diagram form an exemplary architecture of processor 12. System interconnect 14 is coupled to a bus interface unit (BIU) 34 via a bidirectional multiple bit conductor for communicating signals 15. BIU 34 is coupled to a memory management unit (MMU) 42 via a bidirectional multiple bit conductor. Within MMU 42 is a translation look-aside buffer (TLB) 50 having a plurality of entries such as TLB entry 52. BIU 42 is also coupled to a cache 43 via a bidirectional multiple bit conductor. MMU 42 is also coupled to cache 43. BIU 34 is also coupled to both an instruction fetch unit 26 and to load/store unit (LSU) 32 via a bidirectional multiple bit conductor. Instruction fetch unit 26 is coupled to an instruction pipeline (pipe) 22 via a bidirectional multiple bit conductor. The instruction pipeline 22 is coupled to a plurality of execution units 24 via a bidirectional multiple bit conductor, and instruction pipeline 22 is coupled to control circuitry 28 via a bidirectional multiple bit conductor. Instruction fetch unit 26 is coupled to control circuitry 28 via a bidirectional multiple bit conductor. MMU 42 is coupled to control circuitry 28 via a bidirectional multiple bit conductor. Control circuitry 28 is coupled to execution units 24 via a bidirectional multiple bit conductor. BIU 34 is coupled to control circuitry 28 via a bidirectional multiple bit conductor. MMU 42 is coupled to execution units 24 via a bidirectional multiple bit conductor. Execution units 24 are coupled to general purpose registers (GPRs) 30 via a bidirectional multiple bit conductor. GPRs 30 are coupled to a load/store unit (LSU) 32 via a bidirectional multiple-bit conductor. Load/store unit 32 is respectively coupled to control circuitry 28, MMU 42, cache 43, BIU 34, instruction pipeline 22, and execution units 24 via bidirectional multiple bit conductors.

In operation, an instruction is received by processor 12 via system interconnect 14 and BIU 34. The instruction is fetched from storage (such as from memory 16) via BIU 34 by instruction fetch unit 26 and provided to instruction pipeline 22. Instruction pipeline 22 decodes the instruction and controls control circuitry 28 and execution units 24 to execute the instruction.

Figure 4:
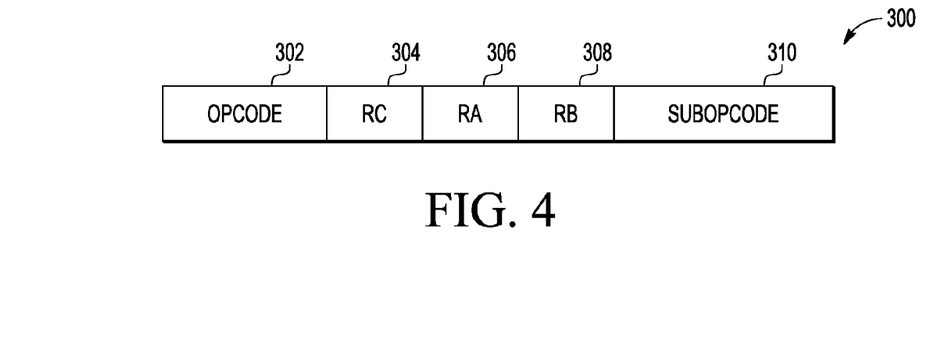
FIG. 4 illustrates, in diagrammatic form, a data processing instruction for implementing a decorated instruction in accordance with one embodiment of the present invention.

One type of data processing instruction processed by processor 12, as described above, is a decorated access instruction. An example format of a decorated access instruction (i.e. a decorated load instruction or a decorated store instruction) is illustrated in FIG. 4 where a decorated access instruction 300 has various fields. A field 302 holds an instruction operation code (opcode) which identifies what type of operation is associated with the instruction. Fields 304, 306, and 308 are register fields for respectively holding register designators RC, RA, and RB which indicate registers within GPRs 30. For a certain type of decorated access instruction, register A, RA, holds a decoration value having a meaning and purpose that will be explained below. Register B contains a virtual address value. The virtual address is coupled by load/store unit 32 to TLB 50 of MMU 42 for translation to a physical address which corresponds to a location within a target device (such as memory 16 or intelligent memory 40). Field 310 is a subopcode field which is used to further define the operation that is associated with the instruction. In one embodiment the opcode and subopcode fields are used to distinguish decorated load and store instruction types from normal (non-decorated) load and store instruction types. It should be understood that the illustrated sequence of instruction fields of instruction 300 is exemplary and the ordering of the instruction fields may be modified. Additional instruction fields that are not illustrated in FIG. 4, such as reserved fields, may also exist.

For a normal load or store instruction type, the register indicated by RB may hold an index value to be added to the address value contained in the register indicated by RA, or may not be used. For normal store-type instructions, the register indicated by RC holds data to be stored to a target device. For normal load-type instructions, register C (RC) indicates the destination register for holding the results of the load operation. For a decorated load instruction, the register indicated by RC holds the results (provided by the target device) of the load operation using the decoration supplied in the register indicated by RA. For a decorated store instruction, the register indicated by RC holds data to be supplied to the target device for use in the modification of a location in the target device, in which the modification is indicated by the decoration value. Alternatively, note that RC may not be present in a decorated load or decorated store instruction. For example, for a decorated store instruction, the decoration value may indicate an increment or decrement by a predetermined value (e.g. one) of the data value stored at a location in the target device indicated by decorated store instruction.

Figure 7:
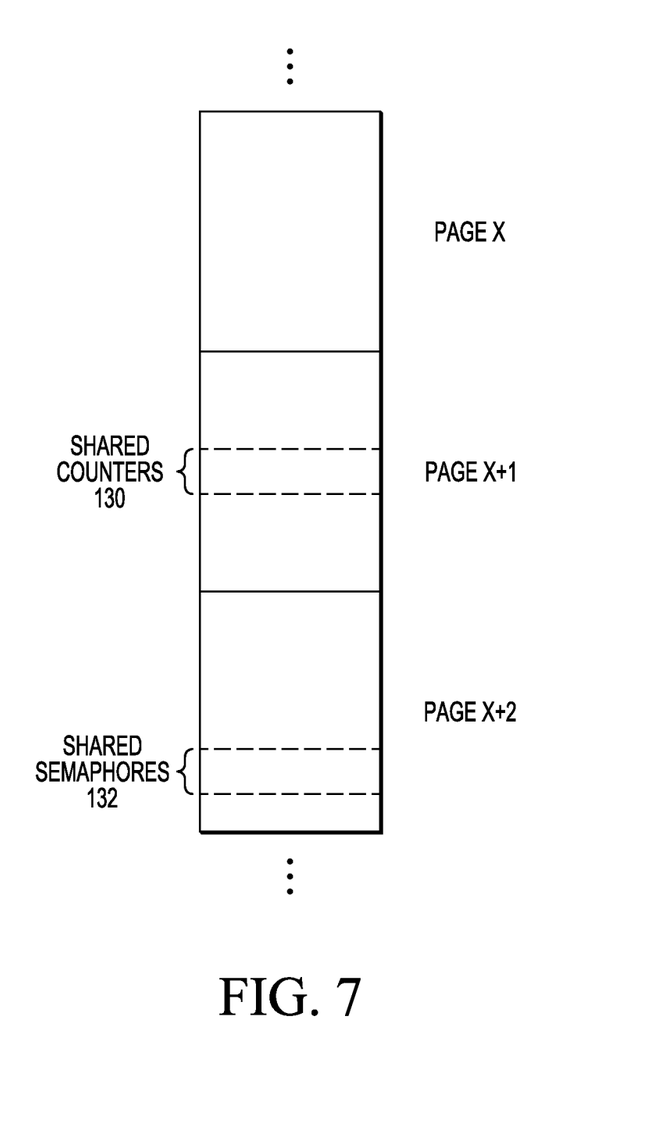
FIG. 7 illustrates, in diagrammatic form, an exemplary portion of the intelligent memory of FIG. 3, in accordance with one embodiment of the present invention.

Referring back to FIG. 2, TLB entry 52 has a stored virtual address. If the virtual address provided by load/store unit 32 matches the virtual address stored in TLB entry 52, TLB entry 52 is selected by MMU 42. TLB entry 52 provides a virtual-to-physical address translation for the virtual address provided by the load/store unit 32 as well providing page attributes. TLB entry 52 has an associated physical address and a page size which defines the memory size of the page in memory where the physical address is located. Each TLB entry also contains a plurality of page attributes. Various attributes can be provided. As an example, the following attributes which form the acronym WIMGE are included: "W"—write-through cache operation; "I"—caching inhibited operation; "M"—memory coherency required; "G"—guarded (where the access is to a volatile storage device); and "E"—endianness (whether big endian or little endian ordering exists). It should be understood that these common attributes are provided by way of example only, and other attributes may be included in addition or in lieu of the described attributes. Also, note that typically, a set of attributes applies for an entire page in the memory. For example, FIG. 7 illustrates, in diagrammatic form, a plurality of pages within a memory, such as within intelligent memory 40. The memory portion illustrated in FIG. 7 includes page X, page X+1, and page X+2. Memory pages may be of any size, but are typically power-of-2 sizes in bytes, such as for example a 4 Kbyte page or a 16 Kbyte page.

Any page can be indicated, such as with the use of the WIMGE attributes, as cache inhibited. However, that means that an access to anywhere within the page is cache inhibited, which may negatively impact performance. For example, page X+1 in FIG. 7 includes shared counters 130 and page X+2 in FIG. 7 includes shared semaphores 132. Counters 130 and semaphores 132 are shared (such as by multiple processors coupled to system interconnect 14, or multiple processes executing within a single processor, such as processor 12). As discussed above, these type of shared resources may be accessed through the use of decorated access instructions, and therefore, it may desirable to cache inhibit accesses to these shared counters and semaphores. However, in order to do so through the use of MMU attributes, all of page X+1 and page X+2 would be indicated as cache inhibited with the "I" attribute. Any access to locations within pages X+1 and X+2 outside of shared counters 130 and shared semaphores 132 would therefore also be cache inhibited even though it may be more beneficial to not inhibit caching for these other accesses. Therefore, the cache inhibiting attribute "I" in MMU 42 allows for limited granularity. Note that counters 130 and semaphores 132 may only occupy a small number of bytes, depending on the number of shared instances. For example, a particular application executed by data processing system 10 may have only a handful of four-byte counters and one-byte semaphores.

Figure 3:
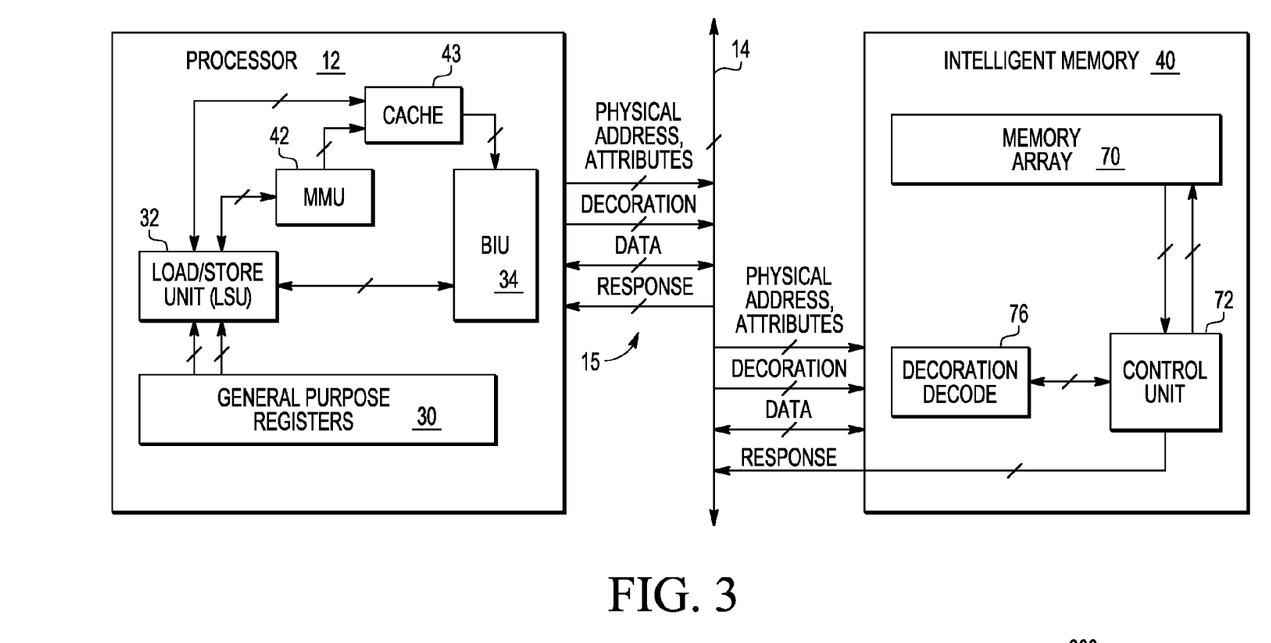
FIG. 3 illustrates, in block diagram form, a portion of the data processing system of FIG. 1 illustrating the processor and an intelligent memory in accordance with one embodiment of the present invention.

Illustrated in FIG. 3 is further detail of one form of the direct connection of processor 12 and intelligent memory 40 via the system interconnect 14, including details of intelligent memory 40. Intelligent memory 40 has a memory array 70 coupled to a control unit 72 via separate single direction conductors. A decoration decode circuit 76 is bidirectionally coupled to control unit 72 and a second output coupled to an input of a permissions check circuit 74. Permissions check circuit 74 has an output coupled to an input of control unit 72. An output of control unit 72 provides a response back to processor 12 via system interconnect 14.

In operation, processor 12 provides to intelligent memory 40 various information in response to executing an instruction. A physical address corresponding to a location within memory array 70 is provided. Attributes associated with the physical address are provided. These attributes include, for example, supervisor or user attribute, a read/write (R/W) attribute, a size attribute, and optionally, other attributes such as a cache inhibited (CI) attribute, a write-through (WT) attribute, a memory coherency required attribute, and other possible attributes, if any. For store-type instructions, store data is also provided. Additionally, decoration information is provided to intelligent memory 40. The decoration information may include a decoration indicator (to indicate whether the current instruction is decorated or not) as well as a decoration value. In the illustrated form, intelligent memory 40 includes control unit 72 which is capable of performing various processing functions on the information that is stored in memory array 70. Which specific predetermined processing function is performed is dependent on the result of the decoration decode circuit 76 which decodes a provided decoration value, and in some embodiments, may also be dependent on the particular physical address value and attributes provided to intelligent memory 40. In one embodiment, a separate decoration indicator is provided to intelligent memory 40 and is used to indicate that the memory access request is a decorated load or store operation, rather than a normal load or store operation. In an alternate embodiment, a particular predetermined decoration value may be interpreted to indicate a normal load or store operation is being requested, in which case no special operation is to be performed.

A decorated access instruction specifies an operation to be performed by intelligent memory 40 via the decoration value. This operation may include, for example, an increment or decrement read-modify-write used to perform statistics updates and is targeted for "decorated storage" which is specialized information storage which is capable of providing local storage read-modify-write operations without involving the processor 12 with the actual read, the execution of a modification operation, and a subsequent store operation. For example, shared counters 130 and shared semaphores 132 of FIG. 7 may be located in memory array 70 of intelligent memory 40 in which, in response to a decorated load or store instruction, control unit 72 performs a read-modify-write as directed by the decoration value without involvement of processor 12. Because memory 40 is capable of determining the meaning of the decoration value and implementing the associated decoration operation, the memory is referred to as being "intelligent." In one embodiment, the meaning of the decoration value is device specific and typically only the device that is specified by the address value will have a decoding for the meaning of the decoration value.

In one embodiment, a decorated access instruction refers to a decorated load instruction or a decorated store instruction. For a decorated load instruction, intelligent memory 40 performs a read-modify-write by reading the target address location of the decorated load instruction as indicated to intelligent memory 40 by the physical address provided by processor 12, modifying that read value in some manner as indicated by the decoration value provided to intelligent memory 40 by processor 12, and writing the result of the modification back to the target address location. In addition, intelligent memory 40 may return the data value at the target address location back to processor 12. Note that the data value returned may either be the data value prior to the modification or the data value after the modification. For example, the data value may be the value that is first read from the target address location or it can the value that is written back to the target address location. The decoration value is decoded by intelligent memory 40 (by decoration decode 76) to know what modification to perform on the read data value. For example, the decoration value may indicate that the modification include an increment or a decrement of the data value by a predetermined amount. The decoration value may also indicate which data value (pre- or post-modification) is to be returned to processor 12.

For a decorated store instruction, intelligent memory 40 may also perform a read-modify-write by reading the target address location of the decorated store instruction as indicated to intelligent memory 40 by the physical address provided by processor 12, modifying that read value in some manner as indicated by the decoration value provided to intelligent memory 40 by processor 12, and writing the result of the modification back to the target address location. Note that, for a decorated store instruction, no data value is returned back to processor 12. The decoration value is decoded by intelligent memory 40 (by decoration decode 76) to know what modification to perform on the read data value, and the store data provided by processor 12 may be used in performing the modification. For example, the decoration value may indicate that the modification include and increment or a decrement of the read data value. Furthermore, for a decorated store instruction, one or more additional values can be provided from the register indicated by RC to intelligent memory 40 for use in the modification. For example, this one or more values can include a mask value which is applied to the data value in the target location to modify the data value, an increment value which is added to the data value in the target location, a decrement value to subtract from the data value in the target location, etc.

Since intelligent memory 40, in response to a decorated access instruction, performs modification of a data value stored in the target address location, it becomes difficult to maintain cache coherency. For example, since processor 12 has no knowledge of the modifications indicated by a decoration value and because the decoration values are interpreted and performed by intelligent memory 40 and not by processor 12, processor 12, when updating a cache line corresponding to decorated storage, cannot know the actual data value that should be stored in the updated cache line. Therefore, in one embodiment, caching is bypassed for some or all decorated instructions, regardless of the memory attribute of "I" for the page of memory being accessed by these decorated instructions.

Figure 5:
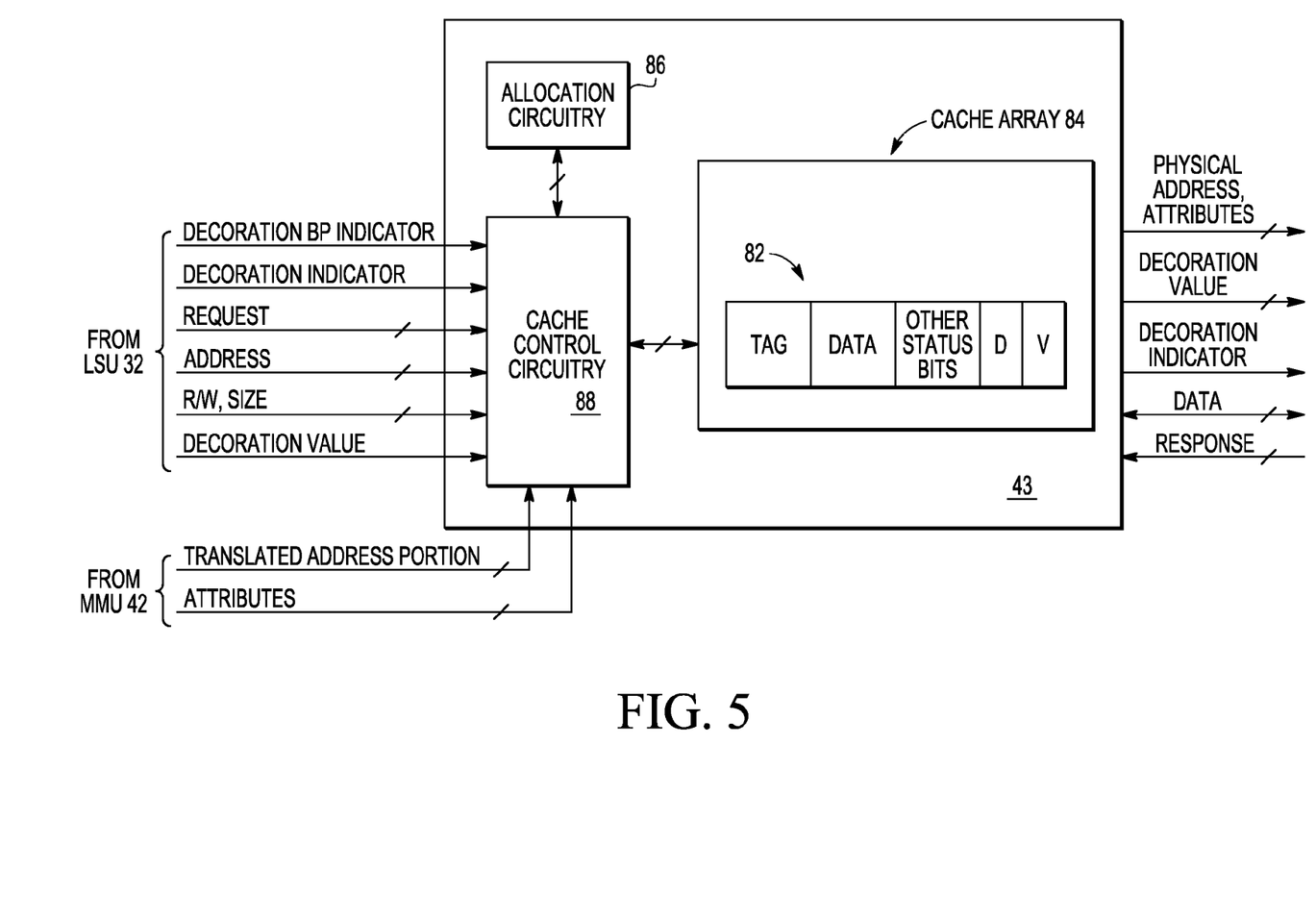
FIG. 5 illustrates, in block diagram form, an exemplary cache of the processor of FIG. 2 in accordance with one embodiment of the present invention.

FIG. 5 illustrates a more detailed view of cache 43 of processor 12. In the illustrated embodiment, cache 43 is a data cache which can provide or receive data in response to load and store instructions. Cache 43 includes cache control circuitry 88, allocation circuitry 86, and cache array 84. Cache array 84 includes a plurality of entries, such as exemplary entry 82. Each entry includes a tag field, a data field, a dirty indicator field (D), and valid indicator field (V). Cache control circuitry 88 is bidirectionally coupled to allocation circuitry 86 and cache array 84. Cache control circuitry 88 receives a decoration bypass (BP) indicator, a decoration indicator, a request, an address, attributes such as a read/write indicator (R/W) and a size indicator, and a decoration value. These may be received from load/store unit 32. Cache control circuitry 88 also receives translated address portions and page attributes from MMU 42. Cache 43 provides a physical address and corresponding attributes, a decoration value, and a decoration indicator to BIU 34 which provides this information to system interconnect 14. Cache 43 receives a response from BIU 34 which is received via system interconnect 14. Also, cache 43 communicates data to and from BIU 34 which is provided and received via system interconnect 14. Note that these signals can be a portion of communication signals 15 described in reference to FIG. 3.

In operation, cache 43, in response to a cache request received via the request signal to cache control circuitry 88, determines whether there is a cache hit or miss in cache array 84. If the cache request corresponds to execution of a decorated access instruction, then the decoration indicator is asserted to notify cache control circuitry 88 accordingly. Furthermore, if the decorated access instruction is one with cache bypass, then the decoration BP indicator is also asserted. If the cache request is not associated with a decorated access instruction with cache bypass, then cache control circuitry 88 operates normally. However, if the cache request is associated with a decorated access instruction with cache bypass, cache control circuitry 88 operates in a manner which bypasses caching, by flushing and invalidating any existing entry in cache array 84 corresponding to the target address of the decorated access instruction, and ensures, by indication to allocation circuitry 86, that no new cache entry is allocated for the decorated access instruction with cache bypass. Note that cache control circuitry 88 also provides the physical address to BIU 34 which may be formed as a combination of the translated address portions from MMU 42 and the address provided to cache control circuitry 88 from LSU 32 (which may, for example, correspond to the index of cache array 84, i.e., the lower order address bits of the physical address). Also, cache control circuitry 88 may simply pass the decoration value and any attributes on to BIU 34. Note that, in one embodiment, cache control circuitry 88 does not decode or interpret the decoration value. However, in one embodiment, rather than provide an explicit decoration indicator and/or an explicit decoration BP indicator, this information can be provided as part of the decoration value where cache control circuitry 88 would use this part of the decoration value to determine whether the associated instruction is a decorated access instruction or a decorated access instruction with cache bypass. However, cache control circuitry 88 (or cache 43) need not decode or interpret any other portion of the decoration value. Operation of cache 43 will be further explained in reference to FIG. 6.

Figure 6:
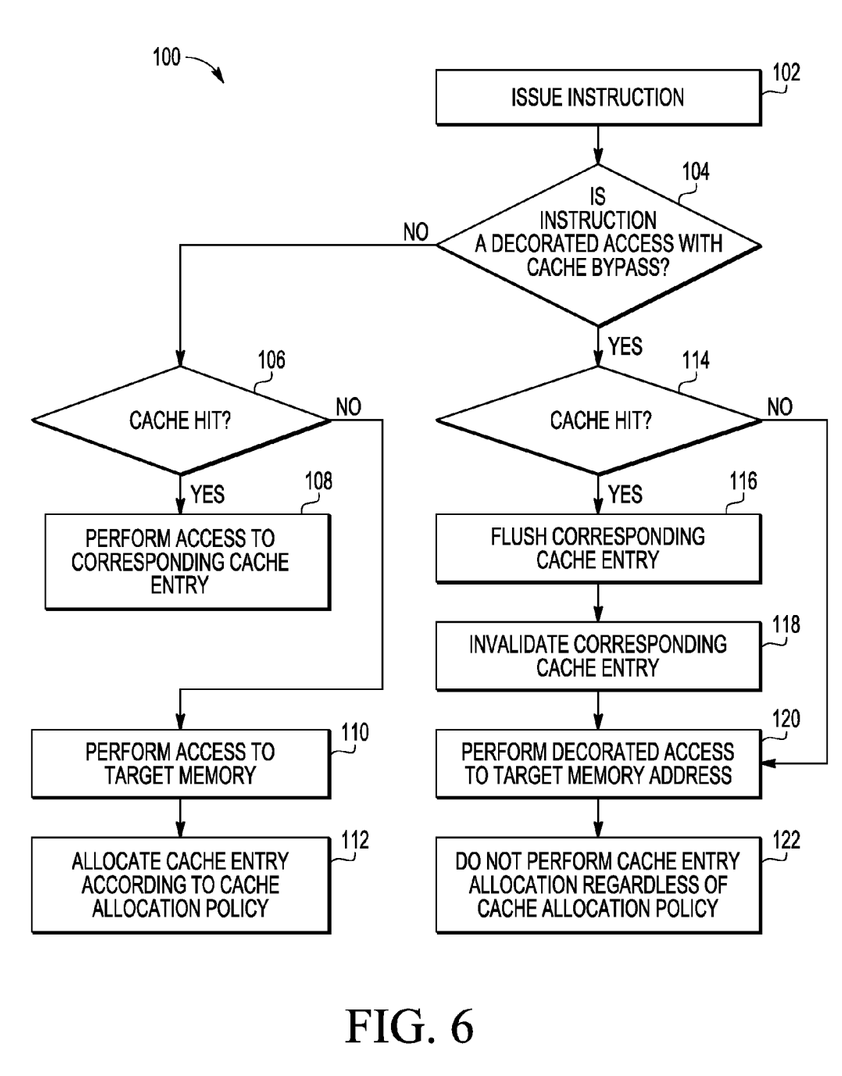
FIG. 6 illustrates, in flow chart form, an exemplary method of processing a decorated instruction in accordance with one embodiment of the present invention.

FIG. 6 illustrates, in flow chart form, a method of processing a decorated access instruction in accordance with one embodiment of the present invention. The method begins with block 102 in which an instruction is issued. In one embodiment, issuing the instruction includes instruction fetch unit 26 providing the instruction to instruction pipe 22 for decode and execution. Flow proceeds to decision diamond 104 in which it is determined if the instruction is a decorated access instruction with cache bypass (e.g. a decorated load or store instruction with cache bypass). In one embodiment, the determination of whether the instruction is a decorated access instruction with cache bypass is made during the decoding of the instruction by an instruction decoder within instruction pipe 22. The information as to whether or not an instruction is a decorated access with cache bypass is provided by instruction pipe 22 via control circuitry 28 to load/store unit 32. In this manner, load/store unit 32 controls assertion of decoration indicator and decoration bypass indicator accordingly. In one embodiment, the determination of whether a data processing instruction is a data processing instruction with cache bypass is made by determining (such as by instruction pipe 22) whether the data processing instruction is a decorated access instruction. With such an embodiment, all decorated access instructions issued by the data processor are decorated access instructions with cache bypass. In this embodiment, only one of decoration BP indicator or decoration indicator may be present since both would not be needed. However, in other embodiments, only some types of decorated access instructions issued by the data processor would be considered as decorated access instructions with cache bypass and other types would not be considered as decorated access instructions with cache bypass. In this embodiment, both decoration BP indicator and decoration indicator would be present and provided to cache 43.

Referring back to FIG. 6, if the instruction is determined to not be a decorated access with cache bypass, flow proceeds to decision diamond 106 where it is determined if there is a hit or miss in the cache. For example, the issued instruction may be a normal memory access (load or store) instruction, and a request may be generated by load/store unit 32 for the target address of the instruction to cache 43, in which cache control circuitry 88 determines if the target address results in a hit or miss. If a hit results, flow proceeds to block 108 in which access to the corresponding cache entry which resulted in the hit is performed. For example, if the request corresponds to a load instruction, in response to the cache hit, the data value of the target address location is provided from the cache entry which resulted in a hit. If the request corresponds to a store instruction, in response to the cache hit, the cache entry is provided with the new data value of the store instruction and the cache entry is marked as dirty (by asserting the D bit) to indicate that the cache entry is no longer coherent with memory. In this manner, no access to external memory need be performed to complete the load or store instruction. If, at decision diamond 106, a cache miss results, flow proceeds to block 110 in which an access to the target memory is performed to complete the load or store operation. Flow then proceeds to block 112 in which a new cache entry is allocated according to the cache allocation policy of cache 43 implemented by allocation circuitry 86. For example, the cache allocation policy may use a least recently used algorithm to select an entry in cache array 84 for replacement to store the information corresponding to the instruction which resulted in the cache miss. Alternatively, other algorithms may be used to select an entry for replacement. In addition, in some embodiments, the access is not performed to target memory in block 110 in a step separate from the allocation performed in block 112. Instead, these two steps are combined, and the allocation operation establishes a new cache entry to which the access is performed, as is known in the art.

Referring back to decision diamond 104, if it is determined that the instruction is a decorated access with cache bypass, flow proceeds to decision diamond 114. (Note that, in the embodiment in which cache bypass only applies to a subset of decorated access instructions, those without cache bypass are treated as described above in reference to decision diamond 106 and blocks 108, 110, and 112. Note that in some embodiments, the entry allocation operation of block 112 is not performed to this subset of decorated instruction accesses, i.e. the cache allocation policy is such that no allocation is performed on a cache miss to this "non-bypass" subset of decorated access instructions.) In the case that the instruction decoding in instruction pipe 22 determines that the instruction is a decorated access with cache bypass, instruction pipe 22 also provides the decoration value to load/store unit 32 so that it can be provided to cache 43. In decision diamond 114, it is determined whether the target address of the decorated access instruction results in a hit or miss. For example, in this case, load/store unit 32 may provide a request to cache 43 with the associated address and attributes, and provide the decoration indicator, the decoration BP indicator, and the decoration value to cache control circuitry 88. Cache control circuitry 88 may then determine whether the address hits or misses in cache array 84. In one embodiment, rather than receive a decoration BP indicator or decoration indicator, cache control circuitry 88 may determine whether or not the instruction has cache bypass based on the decoration value itself. That is, a portion of the decoration value may be used to indicate cache bypass is required.

If, at decision diamond 114, a cache hit results, flow proceeds to block 116 in which the corresponding cache entry which resulted in the hit is flushed. Flushing the cache entry includes determining whether or not the entry is coherent with memory (by checking, for example, if the dirty bit is asserted or not). If it is not coherent (i.e. if it is dirty), meaning the cache entry has the most recent value of the target address, then a memory update is performed to update the value at the target address in the target memory with the value of the cache entry. The dirty bit may then be negated. (Note that in alternate embodiments, an invalidate (such as in block 118) is performed but no flush is performed.) Flow then proceeds to block 118 in which the corresponding cache entry which resulted in the hit is also invalidated by, for example, negating the valid bit of the entry. That is, because a decorated access instruction with cache bypass will result in a modification by the intelligent memory, the cache entry cannot subsequently be guaranteed to be valid. Flow then proceeds to block 120 in which the decorated access to the target memory address is performed. That is, intelligent memory 40 decodes and interprets the decoration value and performs the read-modify-write operation accordingly. Flow then proceeds to block 122 in which no cache entry allocation is preformed regardless of cache allocation policy. For example, the cache allocation policy of cache 43 may indicate that, in response to a cache hit or in response to invalidating a cache entry, an allocation should be performed. However, in block 122, in response to the cache hit of a decorated access instruction with cache bypass, no cache entry allocation is performed, regardless of the policy.

If, at decision diamond 114, it is determined that a cache miss occurs, flow proceeds to block 120, in which the decorated access to the target memory address is performed. That is, regardless of whether the target address resulted in a hit or miss in cache 43, the decorated access with cache bypass is always performed to the target memory address in the target memory (e.g. intelligent memory 40). Flow then proceeds to block 122 in which no cache entry allocation is preformed regardless of the cache allocation policy. For example, the cache allocation policy of cache 43 may indicate that, in response to a cache miss, an allocation should be performed (such as the allocation described in reference to block 112). However, regardless of the cache allocation policy which may state that allocation should be performed, no allocation is performed for a decorated access instruction with cache bypass. Therefore, in block 122, when a decorated load instruction with cache bypass is executed, the data value (obtained as a result of the decoration operation) received by processer 12 is not stored in cache 43 since no cache allocation is performed.

Also, note that MMU 42 may indicate that a particular translated address is on a page that is not cache-inhibited (by way of the "I" bit) and hence cacheable. However, in the situation described above in FIG. 6 for a decorated access with cache bypass, this page attribute provided by MMU 42 is also overridden (just as the cache allocation policy can be overridden) to prevent a decorated access instruction with cache bypass from accessing the cache for the target data value. Also, in one embodiment, MMU 42 may indicate that the page which includes the translated address is designated as having a copyback attribute indicating that the cache is updated while the memory update occurs at a later time, such as when that entry is flushed. However, in the case of a decorated access instruction with cache bypass, cache 43 may be treated as a write-through access to memory even if the page is indicated as copyback. Therefore, due to the nature of a decoration access instruction which requires the intelligent memory to complete operation of the instruction and modification of the data value, a decorated access with cache bypass is performed to the target memory address, possibly overriding the policies of the cache and/or the page attributes provided by the MMU. Furthermore, in alternate embodiments, no MMU may be present thus there may be no cache-inhibited page attribute available to prevent caching. In these systems, cache 43 can still be used to allow for cache bypassing, as described above in reference to FIG. 6.

By now it should be appreciated that there has been provided a data processing system that uses a cache bypass mechanism for decorated access instruction with cache bypass. In this manner, since additional modifications of the target value are performed with a decorated access instruction, any entries which hit in the cache are invalidated, and optionally flushed, and no cache entry allocation is performed.

Because the apparatus implementing the present invention is, for the most part, composed of electronic components and circuits known to those skilled in the art, circuit details has not been explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary data processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. It should be understood that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. Any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of data processing system 10 are circuitry located on a single integrated circuit or within a same device. Alternatively, data processing system 10 may include any number of separate integrated circuits or separate devices interconnected with each other. For example, intelligent memory 40 may be located on a same integrated circuit as processor 12 or on a separate integrated circuit or located within another peripheral or slave discretely separate from other elements of data processing system 10. Peripherals 18 and 20 may also be located on separate integrated circuits or devices. Also for example, data processing system 10 or portions thereof may be readily transformed into software as a representation of physical circuitry or of logical representations convertible into physical circuitry. As such, data processing system 10 may be embodied in a hardware description language of any appropriate type.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, data processing system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Although the invention is described herein with reference to specific embodiments, various modifications and changes can be made without departing from the scope of the present invention as set forth in the claims below. For example, the number of bits used in the address, attributes, permissions and decorations fields may be modified based upon system requirements. The permissions that are associated with a particular operation may vary or be modified. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The following are various embodiments of the present invention.

Item 1 includes a method of operating a data processing system including a data processor and a memory, the method including issuing a data processing instruction by the data processor; determining if the data processing instruction is a decorated access instruction with cache bypass; and determining if the data processing instruction generates a cache hit to a cache. When the data processing instruction is determined to be a decorated access instruction with cache bypass and the data processing instruction is determined to generate a cache hit, the method further includes invalidating a cache entry of the cache associated with the cache hit; and performing by a memory controller of the memory, a decoration operation specified by the data processor instruction on a location in the memory designated by a target address of the data processor instruction, wherein the performing the decorated access includes the memory controller performing a read of a value of the location in memory, modifying the value to generate a modified value, and writing the modified value to the location. Item 2 includes the method of item 1, wherein when the data processing instruction is determined not to be a decorated access instruction with cache bypass and the data processor instruction is determined to generate a cache hit, performing an operation specified by the data processing instruction on the cache entry. Item 3 includes the method of item 1, wherein the determining if the data processing instruction is a decorated access instruction with cache bypass includes determining whether the data processing instruction is of a decorated access instruction type characterized as a decorated access instruction with cache bypass, wherein not all decorated access instruction types issued by the data processor are characterized as a decorated access instruction with cache bypass. Item 4 includes the method of item 1, wherein the determining if the data processing instruction is a decorated access instruction with cache bypass is made by determining if the data processing instruction is a decorated access instruction, and wherein all decorated access instructions issued by the data processor are decoration access instructions with cache bypass. Item 5 includes the method of item 1, wherein when the data processing instruction is determined not to be a decorated access instruction with cache bypass and the data processing instruction is determined not to generate a cache hit, the method further includes performing an operation specified by the data processor instruction on a location in the memory designated by a target address of the data processor instruction, wherein the performing includes storing a first value in the memory location; and storing the first value in a first cache entry of the cache. In the method of item 5, when the instruction is determined to be a decorated access instruction with cache bypass and the data processing instruction is determined to generate a cache hit, the modified value is not stored in the cache entry. Item 6 includes the method of item 1 wherein when the data processing instruction is determined to be a decorated access instruction with cache bypass and the data processing instruction is determined to generate a cache hit, the modified value is not stored in the cache entry. Item 7 includes the method of item 1, wherein the location in memory is designated as cacheable by the data processor. Item 8 includes the method of item 1, wherein the location in memory is located in a page of the memory, wherein the page of the memory is designated as cacheable by the data processor. Item 9 includes the method of item 8, wherein the page of memory is designated as having a copyback attribute by the data processor, wherein the decorated access instruction with cache bypass performs a write-through access to the location in memory. Item 10 includes the method of item 1, wherein the data processor includes a load store unit, the load store unit providing to the cache an indication that the data processor instruction is a decorated access instruction with cache bypass when the data processor instruction is determined to be a decorated access instruction with cache bypass. Item 11 includes the method of item 1, wherein the data processor includes a instruction decoder, wherein the determining if the data processing instruction is a decorated access instruction with cache bypass is performed by the instruction decoder. Item 12 includes the method of item 11, wherein the data processor includes a load store unit, and the method further includes providing by the instruction decoder an indication that the data processor instruction is a decorated access instruction with cache bypass when the data processor instruction is determined to be a decorated access instruction with cache bypass; and receiving by the load store unit the indication and providing by the load store unit the indication to the cache when the data processor instruction is determined to be a decorated access instruction with cache bypass. Item 13 includes the method of item 1, wherein when the data processing instruction is determined to be a decorated access instruction with cache bypass and the data processing instruction is determined to generate a cache hit, the method further comprising flushing the cache entry of the cache associated with the cache hit. Item 14 includes the method of item 1, wherein the flushing the cache entry of the cache associated with the cache hit includes determining if the cache entry is coherent with the location in memory; when the cache entry is determined not to be coherent, writing a data value of the cache entry to the location in the memory before the memory controller performs the read of the value of the location in memory; wherein when the cache entry is determined to be coherent, the data value is not written to the location in memory. Item 15 includes the method of item 1 and further includes receiving by the data processor, the modified value, wherein the modified value is not stored in the cache entry.

Item 16 includes a data processing including an instruction decoder, the instruction decoder for decoding processor instructions including decorated access instructions; an interface circuit operable for coupling to a system interconnect; and a cache. The cache includes a plurality of cache entries and a cache controller, the cache controller in response to receiving a data processor instruction, determines if a target address of the data processor instruction generates a cache hit in a cache entry of the plurality of cache entries, wherein when the data processor instruction is determined to be a decorated access instruction with cache bypass, the cache controller invalidates the cache entry and the decorated access instruction is provided to a system interconnect by the interface circuit for performance by a memory controller of a memory of a decoration operation specified by the data processor instruction on a location in the memory designated by the target address. Item 17 includes the data processor of item 16, wherein when a data processor instruction is determined to be a decorated access instruction with cache bypass, the cache controller cache flushes a cache entry corresponding to a cache hit generated by the data processor instruction. Item 18 includes the data processor of item 16, wherein when a data processor instruction is determined not to be a decorated access instruction with cache bypass, the cache controller performs an operation specified by the data processor instruction on the cache entry corresponding to a cache hit generated by a data processor instruction. Item 19 includes the data processor of item 16, wherein the instruction decoder determines whether a data processor instruction is a decorated access instruction with cache bypass. Item 20 includes the data processor of item 16, and further includes a load store unit, wherein the cache receives an indication of whether a data processor instruction is a decorated access instruction with cache bypass from the load store unit.

What is claimed is:

1. A method of operating a data processing system including a data processor and a memory, the method comprising:
    issuing a data processing instruction by the data processor;
    determining if the data processing instruction is a decorated access instruction with cache bypass;
    determining if the data processing instruction generates a cache hit to a cache; and
    when the data processing instruction is determined to be a decorated access instruction with cache bypass and the data processing instruction is determined to generate a cache hit, the method further comprising:
        invalidating a cache entry of the cache associated with the cache hit; and
        performing by a memory controller of the memory, a decoration operation specified by the data processor instruction on a location in the memory designated by a target address of the data processor instruction, wherein the performing the decorated access includes the memory controller performing a read of a value of the location in memory, modifying the value to generate a modified value, and writing the modified value to the location.

2. The method of claim 1 wherein when the data processing instruction is determined not to be a decorated access instruction with cache bypass and the data processor instruction is determined to generate a cache hit, performing an operation specified by the data processing instruction on the cache entry.

3. The method of claim 1 wherein the determining if the data processing instruction is a decorated access instruction with cache bypass includes determining whether the data processing instruction is of a decorated access instruction type characterized as a decorated access instruction with cache bypass, wherein not all decorated access instruction types issued by the data processor are characterized as a decorated access instruction with cache bypass.

4. The method of claim 1 wherein the determining if the data processing instruction is a decorated access instruction with cache bypass is made by determining if the data processing instruction is a decorated access instruction, wherein all decorated access instructions issued by the data processor are decoration access instructions with cache bypass.

5. The method of claim 1 wherein:
    when the data processing instruction is determined not to be a decorated access instruction with cache bypass and the data processing instruction is determined not to generate a cache hit, the method further comprising:
        performing an operation specified by the data processor instruction on a location in the memory designated by a target address of the data processor instruction, wherein the performing includes storing a first value in the memory location; and
        storing the first value in a first cache entry of the cache; and
    when the instruction is determined to be a decorated access instruction with cache bypass and the data processing instruction is determined to generate a cache hit, the modified value is not stored in the cache entry.

6. The method of claim 1 wherein when the data processing instruction is determined to be a decorated access instruction with cache bypass and the data processing instruction is determined to generate a cache hit, the modified value is not stored in the cache entry.

7. The method of claim 1 wherein the location in memory is designated as cacheable by the data processor.

8. The method of claim 1 wherein the location in memory is located in a page of the memory, wherein the page of the memory is designated as cacheable by the data processor.

9. The method of claim 8 wherein the page of memory is designated as having a copyback attribute by the data processor, wherein the decorated access instruction with cache bypass performs a write-through access to the location in memory.

10. The method of claim 1 wherein the data processor includes a load store unit, the load store unit providing to the cache an indication that the data processor instruction is a decorated access instruction with cache bypass when the data processor instruction is determined to be a decorated access instruction with cache bypass.

11. The method of claim 1 wherein the data processor includes a instruction decoder, wherein the determining if the data processing instruction is a decorated access instruction with cache bypass is performed by the instruction decoder.

12. The method of claim 11 wherein:
    the data processor includes a load store unit;
    the method further comprising:
        providing by the instruction decoder an indication that the data processor instruction is a decorated access instruction with cache bypass when the data processor instruction is determined to be a decorated access instruction with cache bypass; and
        receiving by the load store unit the indication and providing by the load store unit the indication to the cache when the data processor instruction is determined to be a decorated access instruction with cache bypass.

13. The method of claim 1 wherein when the data processing instruction is determined to be a decorated access instruction with cache bypass and the data processing instruction is determined to generate a cache hit, the method further comprising flushing the cache entry of the cache associated with the cache hit.

14. The method of claim 1 wherein the flushing the cache entry of the cache associated with the cache hit includes:
    determining if the cache entry is coherent with the location in memory;
    when the cache entry is determined not to be coherent, writing a data value of the cache entry to the location in the memory before the memory controller performs the read of the value of the location in memory;
    wherein when the cache entry is determined to be coherent, the data value is not written to the location in memory.

15. The method of claim 1 further comprising:
    receiving by the data processor, the modified value, wherein the modified value is not stored in the cache entry.

16. A data processor comprising:

an instruction decoder, the instruction decoder for decoding processor instructions including decorated access instructions;

an interface circuit operable for coupling to a system interconnect; and a cache, the cache including a plurality of cache entries and a cache controller, the cache controller in response to receiving a data processor instruction, determines if a target address of the data processor instruction generates a cache hit in a cache entry of the plurality of cache entries, wherein when the data processor instruction is determined to be a decorated access instruction with cache bypass, the cache controller invalidates the cache entry and the decorated access instruction is provided to a system interconnect by the interface circuit for performance by a memory controller of a memory of a decoration operation specified by the data processor instruction on a location in the memory designated by the target address.

17. The data processor of claim 16 wherein when a data processor instruction is determined to be a decorated access instruction with cache bypass, the cache controller cache flushes a cache entry corresponding to a cache hit generated by the data processor instruction.

18. The data processor of claim 16 wherein when a data processor instruction is determined not to be a decorated access instruction with cache bypass, the cache controller performs an operation specified by the data processor instruction on the cache entry corresponding to a cache hit generated by a data processor instruction.

19. The data processor of claim 16 wherein the instruction decoder determines whether a data processor instruction is a decorated access instruction with cache bypass.

20. The data processor of claim 16 further comprising:

a load store unit, the cache receives an indication of whether a data processor instruction is a decorated access instruction with cache bypass from the load store unit.

* * * * *